(12) United States Patent
Kelly et al.

(10) Patent No.: US 7,058,510 B2
(45) Date of Patent: Jun. 6, 2006

(54) SYSTEM AND METHOD FOR PROVIDING PERSONALIZED WEATHER REPORTS AND THE LIKE

(75) Inventors: Terence F. Kelly, Madison, WI (US);
Grant H. Brohm, Madison, WI (US);
Richard T. Daly, Madison, WI (US);
Victor W. Marsh, Fitchburg, WI (US);
John S. Moore, Middleton, WI (US);
Brett A. Wilt, Madison, WI (US)

(73) Assignee: Weather Central, Inc., Madison, WI (US)

( * ) Notice: Subject to any disclaimer, the term of this patent is extended or adjusted under 35 U.S.C. 154(b) by 0 days.

(21) Appl. No.: 10/995,048

(22) Filed: Nov. 22, 2004

(65) Prior Publication Data

US 2005/0154531 A1     Jul. 14, 2005

Related U.S. Application Data

(63) Continuation of application No. 09/686,029, filed on Oct. 11, 2000, now Pat. No. 6,823,263, which is a continuation-in-part of application No. 09/547,195, filed on Apr. 12, 2000, now Pat. No. 6,498,987.

(51) Int. Cl.
*G01W 1/00*     (2006.01)
(52) U.S. Cl. .......................................................... 702/2
(58) Field of Classification Search ................. 702/2, 702/3, 4, 5; 342/26 R, 26 A, 26 B, 26 C, 342/26 D
See application file for complete search history.

(56) References Cited

U.S. PATENT DOCUMENTS

| | | | | |
|---|---|---|---|---|
| 5,654,886 | A | * | 8/1997 | Zereski et al. ................. 702/3 |
| 5,974,447 | A | * | 10/1999 | Cannon et al. ............. 709/206 |
| 5,991,735 | A | * | 11/1999 | Gerace ......................... 705/10 |
| 6,021,433 | A | * | 2/2000 | Payne et al. ................ 709/219 |
| 6,040,781 | A | * | 3/2000 | Murray .................. 340/825.22 |
| 6,360,172 | B1 | * | 3/2002 | Burfeind et al. ............... 702/2 |
| 6,498,987 | B1 | * | 12/2002 | Kelly et al. .................... 702/3 |
| 6,560,456 | B1 | * | 5/2003 | Lohtia et al. ............... 455/445 |
| 6,823,263 | B1 | * | 11/2004 | Kelly et al. .................... 702/3 |

* cited by examiner

*Primary Examiner*—Donald McElheny, Jr.
(74) *Attorney, Agent, or Firm*—Reinhart Boerner Van Deuren s.c.

(57) ABSTRACT

A system and method for generating weather reports and the like which are precisely computed automatically for a particular individual user's geographic location and which are provided automatically to the individual user. A user establishes an individualized user profile in which the user defines a particular location of interest, a contact address, and optionally, a personalized activity weather condition profile. A detailed and accurate weather forecasting model is run to provide high geographic and temporal resolution forecast data. The high resolution forecast data is compared to the individual user profile and a personalized weather report for the particular location, times, and conditions of interest are provided automatically to the individual, e.g., via e-mail and/or at a personalized internet web page. A detailed weather forecast report may be provided in an easily readable tabular form, with notable weather conditions, e.g., daily high and low temperatures, highlighted.

34 Claims, 12 Drawing Sheets

---

From: My27MicroCast@myweather.net
Sent: Tuesday, October 03, 2000 3:18 PM
To: pmanghera@foleylaw.com
Subject: Check Your Forecast for golf

96

Dear Peter,

The weather forecast for golf on 10/4/00 predicts unfavorable conditions according to your weather preferences. Click on this link to see your personalized weather page:
http://www.wkowtv.com/$spindb.query.my.weather.9753-346

Sincerely,
27 Weather Central Chief Meteorologist Bob Lindmeier

98

*********************************************
If your email program does not bring up your web browser when you click on the link in this message, you should copy your link and place it in the Location (Netscape) or Address (Internet Explorer) lines of your web browser.
*********************************************

50 \

Make a Personal Event

Let us notify you when your preferred weather conditions are forecast. We'll watch for your preferred weather conditions using the forecast for your specific locations. Your personal weather web page will tell you at a glance if good weather is expected. Just follow the steps below.

1 *Choose your activity*

Select an activity from our list   *or*   Describe your activity below

51 ──[ golf ▼ ]             [           ]

── 57

2 *Briefly describe your event.* (for example: Golf at Odana)

[ Golf at University Ridge ]── 52

3 *Provide the location of your event.*

<u>Click here to get help finding locations</u> or provide values below.

ZIP Code                        Latitude   Longitude

53 ──▶ [ 53701 ]    *or*    [   ] [   ]

(example: (example:
                                              41.883)    87.622)

4 *Provide the date and time of your event*

54 ──▶    Date  [ Oct ▼ ] [ 4 ▼ ]

Time  *from*  [ 8:00 AM ▼ ] *to* [ 6:00 PM ▼ ]

5 *Select the weather conditions that you feel are important for this activity. (hint: Click on the boxes next to the weather conditions you care about)*

FIG. 4a

*Choose your ideal range for the weather conditions you have selected.*
6 *(The conditions are considered "good" only if all of them are in the range you have selected for the entire time period of your event. If you make the range(s) too narrow, the chances of "good" conditions will be small)*

| | 55 | | | 56 |
|---|---|---|---|---|
| ☑ | Temperature | from | 71 ▼ | |
| | | to | 86 ▼ | |
| ☐ | Sky Conditions | from | Clear ▼ | |
| | | to | Clear ▼ | |
| ☐ | Humidity | from | Dry ▼ | |
| | | to | Dry ▼ | |
| ☑ | Precipitation | from | None ▼ | |
| | | to | None ▼ | |
| ☑ | Wind Speed | from | Light (5-8 mph) ▼ | |
| | | to | Moderate (9-14 mph) ▼ | |
| ☐ | Wind Direction | from | North ▼ | |
| | | to | North ▼ | |

*Click "Activate" to add/change this event in your personal event schedule.*
7 *(We will include a forecast for your new event the next time your page is updated)*

58 → [ Activate ]    [ Delete this Event ]    [ Reset ]

Copyright © 2000 MyWeather LLC All rights reserved.

FIG. 4b

Hi Matt! Happy Thursday, March 30, 2000

The forecast today is for cloudy skies, with a high of 66° at 3:00 P.M..

Rain will begin at about 4:17 P.M., and will end at 10:18 P.M., you'll receive .16 inches.

- All the best for a great day!

Bob Lindmeier

P.S. Tonight I have a "special" on how to golf in high winds.

FIG. 5

Personal Event Schedule for Peter Manghera — 82 golf
New Event - Golf at University Ridge between 8AM and 6 PM on 10/4/00 — 99

Make a new personal event

This forecast is for your home at 2909 Oakridge Ave in Madison, Peter. Temperatures will begin to get cooler and clouds will thicken and lower throughout the day and bring a few scattered showers this afternoon from a disturbance in the upper levels of the atmosphere. Our MicroCast model below is forecasting temps in the 50s, but some locations will see temps move into the 60s. 27 Weather Central Meteorologist Kevin Craig

— 84

Tuesday, October 3
Afternoon (12:30pm-6pm)

There is a slight chance for showers with an increased chance north of here. Winds will be 5 to 10 MPH from the northwest turning from the north as the afternoon progresses. Temperatures will remain around 52 with today's high of 53 occurring around 4:30pm.

51-53
NW-NE 5-10 mph

Evening (6:30pm-Midnight)

Moderate rain showers are expected. Rainfall should begin around 8:30pm and continue into overnight. Heavier rain west of here will drop up to 0.21 inches of rain. Winds will be 5 to 10 MPH from the north. Temperatures will stay near 51.

50-52
NE 5-10 mph

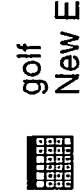  

FIG. 6a

Wednesday, October 4
Morning (6:30am-Noon)

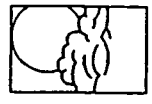

44-55
N 10-15 mph

Dry this morning with mostly cloudy to mostly sunny skies. Winds will be 10 to 15 MPH from the north. Temperatures will rise from 45 to 55 late morning.

Afternoon (12:30pm-6pm)

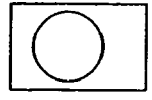

51-57
NE 5-10 mph

It will be dry and clear with north winds from 5 to 10 MPH. Temperatures will rise from 55 early this afternoon to the high for the day of 57 at 4:00pm as they drop back down to 51 later this afternoon.

Evening (6:30pm-Midnight)

40-49
NE-SW 5 mph

Widely scattered storms are expected, mainly to the north. Temperatures will decrease from 49 early evening to 40.

Night (12:30am-6am)

40-40
NE 5 mph

Widely scattered storms are expected, mainly to the north. Temperatures will linger at 40 with today's low of 40 occurring around 6:00am.

FIG. 6C

From: My27MicroCast@myweather.net
Sent: Tuesday, October 03, 2000 5:28 AM
To: pmanghera@foleylaw.com
Subject: New Forecast From My 27 MicroCast

⟵ 92

Dear Peter,

Welcome to Tuesday. Expect a cold Canadian BLAST of air this week, especially on Friday and Saturday as temperatures will not make it out of the 40s. For your personal MicroCast forecast, click below. Have a good day.

*********************************

You have more details waiting for you on your personal forecast page.
Click on this link now:
http://www.wkowtv.com/$spindb.query.my.weather.9753-346 ⟵ 94

If your email program does not bring up your web browser when you click on the link in this message, you should copy your link and place it in the Location (Netscape) or Address (Internet Explorer) lines of your web browser.
*********************************

Sincerely,
27 Weather Central Meteorologist Kevin Craig

FIG. 7

From: My27MicroCast@myweather.net
Sent: Tuesday, October 03, 2000 3:18 PM
To: pmanghera@foleylaw.com
Subject: Check Your Forecast for golf Dear Peter, The weather forecast for golf on 10/4/00 predicts unfavorable conditions according to your weather preferences. Click on this link to see your personalized weather page:
http://www.wkowtv.com/$spindb.query.my.weather.9753-346

Sincerely,
27 Weather Central Chief Meteorologist Bob Lindmeier

*********************************************
If your email program does not bring up your web browser when you click on the link in this message, you should copy your link and place it in the Location (Netscape) or Address (Internet Explorer) lines of your web browser.
*********************************************

FIG. 8

SYSTEM AND METHOD FOR PROVIDING PERSONALIZED WEATHER REPORTS AND THE LIKE

This application is a continuation of U.S. application Ser. No. 09/686,029, filed Oct. 11, 2000, U.S. Pat. No. 6,823,263 which is a continuation-in-part of U.S. application Ser. No. 09/547,195, filed Apr. 12, 2000, U.S. Pat. No. 6,498,987.

FIELD OF THE INVENTION

The present invention pertains generally to systems and methods for producing weather reports including current weather conditions and weather forecasts, and, more particularly, to systems and methods for providing such weather reports and forecasts to individuals and businesses, e.g., over computer networks such as the internet.

BACKGROUND OF THE INVENTION

Most of the current weather and weather forecast information used by individuals and businesses is obtained by them from weather reports provided by local television and radio stations. Such reports are typically prepared by meteorologists at a television or radio station serving a particular geographical area, e.g., a large city and surrounding environs. The reports are based on current weather information available to the meteorologist which may be provided by various local (e.g., local radar) and national (e.g., NEXRAD radar and weather satellite) weather information sources. A meteorologist may also employ computer implemented weather forecasting models in preparing a weather forecast report. A meteorologist may prepare and/or update several such reports throughout the day, and such reports may be provided as part of periodic radio and/or television broadcasts. Such weather reports and forecasts may also be provided in printed form, e.g., in a daily newspaper. A person who is interested in the current or forecast weather conditions for a geographic location accesses such a weather report by tuning in to the television or radio broadcast of the report at the designated time, reading the paper, etc. If severe weather threatens a particular area, an emergency radio or television broadcast may be made to provide such information to the public immediately, and, if necessary, continuously. For example, a television station may provide a graphic indication of the general location (e.g., county) and nature of severe weather, (e.g., tornado, and thunderstorm warnings, etc.) as part of its television broadcast, throughout the period during which severe weather threatens an area.

A severe limitation of such conventional weather reports and forecasts is that they are generalized over a large geographic area and, typically, an extensive period of time. For example, a typical conventional weather forecast will provide predicted high and low temperatures, sky conditions, precipitation, etc., for the day, or for several days, for a particular geographical area, e.g., the city where the television or radio station is located and the surrounding area. However, the actual current and forecast weather conditions for the downtown area of a city, the suburbs, and surrounding rural areas will, of course, be different. For example, different areas in and around the city will achieve different high and low temperatures at different times during the day, and precipitation will reach different points in a television station's viewing area at different times during the day and at different levels of intensity. A meteorologist's forecast may indicate that some areas within a television station's viewing area will receive significant precipitation during the day, while other areas will receive none (e.g., a forecast of "widely scattered showers"). Thus, generalized weather conditions and forecasts for a particular area, e.g., a television or radio station viewing and/or listening area, may be of limited use to any particular individual, especially individuals living or working outside of a central city area, in that such general information will not provide an accurate indication of, e.g., high and low temperatures and sky conditions at any particular time during the day at that individual's home or place of work, and when, how much, or even if precipitation will arrive at that individual's home or place of work. Businesses, in particular, may require more specific and detailed weather forecast information. For example, the forecast weather conditions at a particular construction location may be used to decide which activities will take place at that site on a particular day. Generalized weather forecasts for a relatively large area are of limited usefulness to such businesses.

The National Weather Service issues weather forecasts. However, such forecasts are "zone" forecasts generalized over National Weather Service "zones" which may cover a hundred miles square or more. Thus, such National Weather Service forecasts also do not provide an individual or business with a detailed or accurate weather forecast for a particular localized area of interest.

Advances in computer connectivity technology have allowed television and radio station meteorologists to provide access to their latest weather condition and forecast reports via computer over the internet at any time desired. Thus, an individual need not try to catch the local television or radio broadcast of a weather report to get the latest weather information. An individual may be able to access weather reports and other outdoor information for both local and remote geographic locations via computer over the internet. For example, U.S. Pat. No. 5,654,886 to Zereski, Jr., et al. describes a multimedia outdoor system which automatically compiles outdoor information, including current weather conditions, traffic, meteorologist-provided weather forecasts, etc., from a variety of sources and locations, and generates multimedia presentations based on the information for local areas throughout the country. In such a system, weather forecasts, including oral forecast presentations, are manually generated by meteorologists and entered into the system periodically. The multimedia reports generated by the system from such forecasts are stored in a presentation database. An interested user may access the weather report for a local area, such as a city, by accessing the presentation database via computer over, e.g., the internet. However, the individual weather reports and forecasts upon which the multimedia weather reports provided over the internet are based are conventional weather reports and forecasts which are generalized over a wide geographic area and period in time, as described above. Thus, such a system does not provide an individual with a detailed or accurate weather report and forecast for that individual's particular residence or place of work.

U.S. Pat. No. 6,018,699, to Baron, Sr., et al. describes a weather alert manager which receives meteorological data, e.g., NEXRAD data, which includes weather information defining storms within a relevant geographic area. The current position and predicted path of a storm is determined from the data and combined with a geographical grid to produce a storm profile indicating storm severity and if a storm is in or is likely to enter any geographical grid area. The storm profile may be distributed to remote units located within a particular grid area to provide storm warnings to individuals in such areas. For example, the remote unit may be a cellular phone or pager which is associated with a particular area, and which receives the storm profile to provide the appropriate warning when a storm is in or approaching that area. Such a system, however, only provides limited severe weather warning information for existing storm cells and does not provide an individual with a detailed and accurate weather report and forecast of general weather conditions, e.g., high and low temperatures, precipitation, wind speed and direction, etc., for that individual's particular residence or place of work.

U.S. Pat. No. 6,023,223 to Baxter, Jr. describes a plurality of remotely located environmental sensors, e.g., temperature sensors, which are linked to a database server having data tables for holding the environmental data. A user can access the database, via the internet, to search for environmental information of interest. The user may also store a profile on the server which contains predefined environmental threshold triggers. When an environmental condition meets the threshold trigger, the user may be notified, e.g., via e-mail, facsimile message, pager, or telephone. Such a system, however, only provides a warning to a user if current conditions satisfy preselected thresholds and only provides limited environmental information for an individual's particular area of interest if an environmental sensor happens to be positioned in that area.

Complex weather forecasting models exist which can be used to generate accurate and detailed weather forecast data for narrowly defined geographic locations and periods in time. An example of such a weather forecasting model is the ADONIS model, available from Weather Central, Inc., of Madison, Wis. This model is based on a three-dimensional weather forecasting model of the atmosphere developed originally by Colorado State University and the University of Wisconsin. This model is a non-hydrostatic model, which therefore takes into account changing atmospheric moisture conditions, as well as topography, snow cover, etc., in generating weather forecast data. The model is, therefore, highly accurate. Some weather forecasting models, including ADONIS, are capable of producing weather forecast data with both high geographic and temporal resolution. For example, the ADONIS model may be run to provide detailed forecast data (e.g., temperature, sky conditions, wind, precipitation, etc., for, e.g., up to 25 different vertical levels of the atmosphere) for geographical areas only a few miles across and in half hour increments extending several days into the future. By extrapolation between such closely spaced points for which weather forecast model data is generated, accurate forecast weather conditions for any modeled time at any point in a modeled geographic area may be obtained. A practical limitation of such highly accurate and complex models is, however, the computation resources and time required to obtain such high resolution forecast data. As a practical matter, using current technology, the computation resources and time required to run such a model to generate high resolution forecast data for the entire country would be prohibitive for any single local television or radio station weather operation. In addition, such highly detailed models must be capable of producing thousands of near-real-time individualized weather forecasts in order to be useful to individuals and businesses requiring precise pinpoint forecasts.

SUMMARY OF THE INVENTION

The present invention provides a system and method for generating weather reports and the like which are precisely computed automatically for a particular individual or business user's geographic location, e.g., home or work, and which are provided automatically directly to the individual user or business. The present invention may also provide personalized advanced notice to a user when forecast weather conditions meet a user definable weather condition profile for outdoor activities of interest to the user. In accordance with the present invention, a user establishes an individualized user profile in which the user defines a particular location of interest (e.g., home or work), a contact address (e.g., e-mail address or pager number) to which the personalized weather report is to be delivered, and, optionally, a personalized activity weather condition profile, establishing a preferred weather condition profile for activities of interest. Alternatively, or additionally, an address at which the personalized weather report is to be made available, e.g., a personalized internet web page address, may be automatically generated and provided to the user. A detailed and accurate weather forecasting model is run to provide high geographical and temporal resolution forecast data. This high resolution forecast data is compared to the individual user profile and a personalized weather report for the particular location, times, and conditions of interest to the individual is provided directly to the individual or business, e.g., via e-mail and/or at the user's personalized internet web page address. Individual personalized weather reports generated from pre-established user profile information and model forecast data may be generated and delivered and/or updated automatically, without human intervention, e.g., each time the forecast model is run.

An exemplary system for providing personalized weather reports in accordance with the present invention includes a main computer system, which may be implemented, for example, as part of a television or radio station news and weather reporting operation. The main computer system includes weather forecast modeling software for calculating and presenting high geographical and temporal resolution forecast data for a wide, but limited, geographical area, e.g., the geographical area serviced by a television or radio station or newspaper. The weather forecasting model preferably accepts and stores as inputs thereto initialized weather model data, e.g., initial atmospheric condition information, which is generated and provided from a central location to the local main computer system (e.g., by satellite or internet data delivery). Since weather conditions modeled in the main computer are for a geographic area which is limited to, e.g., the television station's viewing area, and the number of personalized weather reports generated and delivered by the main computer system is limited by the number of customers in a limited geographic area, computation resources and run-times for even very high resolution modeling and report generation are reasonable.

Alternatively, a single computer system may be employed to model weather conditions and generate personalized weather reports for a wider geographic area, such as the entire country. Such a system may be employed for less high resolution modeling. With advances in computer technology, it may be possible to employ a single computer system for high resolution modeling of weather conditions across the entire country. As a preferred alternative, a conventional computer system may be employed to run a high resolution weather forecast model for a limited geographic area, e.g., a local television station's viewing area, and a less high resolution weather forecast model for areas outside of the limited geographic area. Such a system minimizes computer resource requirements while allowing the vast majority of users in a television/radio market to receive high resolution personalized weather reports for their homes and businesses within the local area, and those with an interest in weather forecasts for other locations, such as, for example, a vacation home located outside of the local area, also to obtain personalized weather reports for such locations. In any case, the forecast model(s) may be run periodically, e.g., twice a day, or each time initialization conditions are received by the computer system running the model(s), to provide high resolution forecast data and personalized reports for the geographical area of interest.

The main computer system includes a user profile generator. The user profile generator provides various user profile set-up menu user interfaces which allow a user to establish a user profile. These menus may be accessed by a user by use of, for example, a personal computer connected to the main system computer over a network such as the internet. Using such menus, a user establishes a personal user profile which includes a particular location of interest, e.g., home, vacation home, or work, for which the user would like a detailed weather report, a contact address, e.g., e-mail address or pager number, to which the personalized weather report is to be delivered and, optionally, a personalized activity weather condition profile, establishing a preferred weather condition profile for activities of interest to the user. Additionally, the computer system may automatically generate a personalized internet web page address at which the user's personalized weather report will be accessible. The personalized internet web page address may be provided to the user automatically by the computer system, for example, in an e-mail message which is automatically delivered by the computer system to the user's contact address. All such user profile information is stored in a user profile database.

Each time the high resolution forecast model is run, the resulting forecast data is compared to the user profiles saved in the user profile database and personalized weather reports are generated automatically by a personalized report generator implemented in the main computer system. Automated detailed personalized report generation is possible using a high resolution weather forecast model, such as ADONIS, which provides as an output exact and discreet weather condition readings for specific points in time at pinpoint lat./lon. locations covering an entire geographic area of interest. Such high resolution weather forecast model data may, optionally, be constrained to within certain limits, e.g., using constraints established by a meteorologist, before the model data is used to generate a personalized weather report. The user location provided in the user profile may be converted to a lat./lon. coordinate and used to automatically pull detailed forecast weather conditions for that location from the forecast model data to generate the personalized weather report. If both high resolution (for a limited local geographic area) and lower resolution (for a wider geographic area) weather forecast models are run, the user location is used to determine which resolution of modeled weather forecast data will be employed.

Personalized weather reports are delivered to a user at the contact address indicated in the user profile, and include detailed information on forecast weather conditions, e.g., high and low temperatures, the times those temperatures will be reached, sky conditions, wind conditions, whether or not there will be frost or dew, etc., for the specific user location identified by the user in the user profile. Such detailed personalized weather reports may be delivered directly to a user's contact address, e.g., in the form of an e-mail or phone message. Alternatively, or additionally, the detailed personalized weather report may be provided as an internet web page accessible at the user's personalized internet web page address. Preferably, a summary personalized weather report may be provided, e.g., as an e-mail message, to the user's contact address, with a link to the user's personalized internet web page provided therein. Thus, the user may be periodically reminded that an updated detailed personalized weather forecast is available at the user's personalized internet web page address. Preferably, detailed weather forecast conditions for periods (e.g., hours) throughout a day are provided in an easily readable form, such as a tabular form, wherein, for example, high and low temperatures, periods of precipitation, etc., are highlighted. The forecast data is also compared to the personalized activity weather condition profile established by the user, and a notice is provided to the user indicating if and when such favorable weather conditions for the activity will occur at a selected activity location (which may be different from the user's home or work location).

Further objects, features, and advantages of the invention will be apparent from the following detailed description taken in conjunction with the accompanying drawings.

BRIEF DESCRIPTION OF THE DRAWINGS

In the drawings:

FIG. 4 is an exemplary outdoor activity weather condition profile set-up menu user interface for use in a system and method for providing personalized weather reports in accordance with the present invention.

FIG. 5 is an exemplary personalized e-mail weather report provided in accordance with the present invention.

FIG. 7 is an exemplary personalized summary e-mail weather report provided in accordance with the present invention, including a link to a personalized internet web page wherein a more detailed personalized weather report is provided.

FIG. 8 is an exemplary personalized e-mail message indicating if and when weather conditions established in a personalized activity weather condition profile in accordance with the present invention will be satisfied.

DETAILED DESCRIPTION OF THE INVENTION

Figure 1:
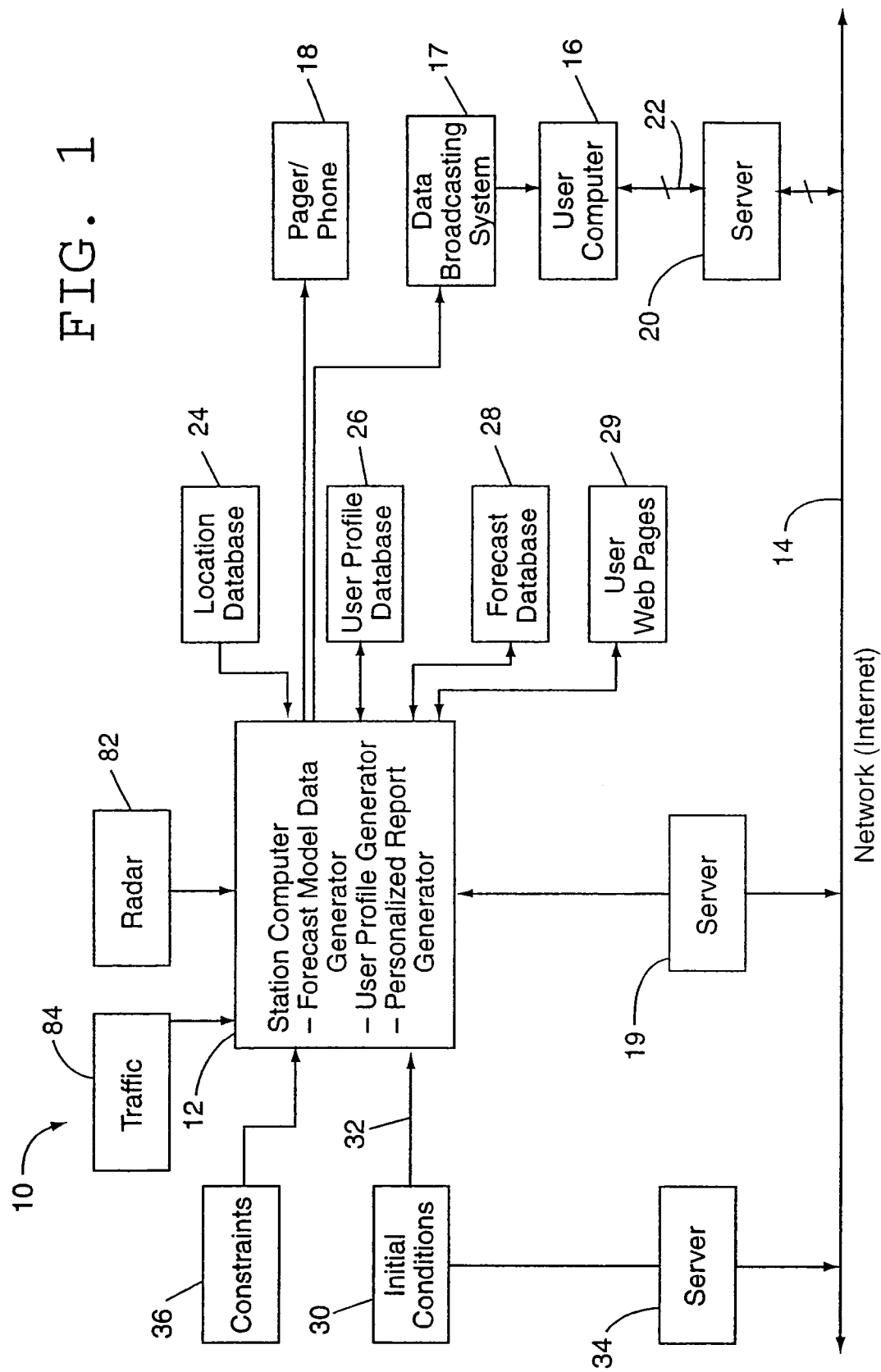
FIG. 1 is a schematic block diagram of an exemplary system for providing personalized weather reports in accordance with the present invention.

A schematic block diagram of an exemplary system 10 for providing personalized weather reports in accordance with the present invention is illustrated in, and will be described in detail with reference to, FIG. 1. In accordance with the present invention, personalized weather reports, and the like, are generated by a main-computer system 12 which communicates, e.g., via a network connection 14 with a user's computer 16. The main computer system 12 may be implemented as one or more conventional computers located at a television or radio station or newspaper which services a particular geographic area of the country. The user's computer 16 may be implemented in a conventional manner as a personal or handheld wireless computer, Web TV terminal, digital television system, or the like. Two-way communications between the main computer system 12 and the user's computer 16 may be provided over any suitable communications network or link 14. Alternatively, communications between the main computer 12 and the user's computer 16 may be via any known or future data broadcasting system 17. The main computer 12 may also be in communication with a user's alphanumeric pager or cellular or other telephone 18, for providing personalized weather reports to the user thereby, as will be discussed in more detail below.

Preferably, and conveniently, the main computer system 12 and the user's computer 16 may communicate with each other via the internet 14, using conventional and widely known internet communications formats, protocols, etc. The main computer system 12 and user's computer 16 may be connected to the internet 14 in a conventional manner via servers 19 and 20, respectively. Note that the server 19 providing an internet connection for the main computer system 12 may be separate from or an integral part of the main computer system 12. The server 20 providing an internet connection for the user computer 16 may typically be provided by a commercial internet service provider. Communications between the user's computer 16 and the internet service provider's server 20 may typically be accomplished using a modem connection for communication over conventional telephone lines, cable television lines, or other physical or radio links 22. It should be understood that the central computer system 12 may provide personalized weather reports to many user computers 16 connected to the main computer system 12 over the internet 14. For example, a single internet service provider's server 20 may provide a connection to the central computer 12 over the internet 14 for many user computers 16, and an essentially unlimited number of servers 20 may be on the internet 14.

As mentioned above, the main computer system 12 may be implemented in a conventional manner using a single computer or multiple computers networked together to perform the functions required. The main computer system 12 may include conventional computer peripheral devices (not shown), including input and output devices such as keyboards, mouses, monitors, printers, etc. The main computer system 12 will also include conventional computer memory devices, including disk or tape storage devices for storing the computer programs which will be run on the main computer system 12 to implement a method for providing personalized weather reports and the like in accordance with the present invention. Memory, e.g., disk storage space, etc., is also provided for the storage of databases of information which is employed by the programs running on the main computer system 12 for generating personalized weather reports and the like. Such databases include a geographic location database 24, a user profile database 26, and a weather forecast database 28. The use of each of these databases 24, 26, and 28 in generating a personalized weather report in accordance with the present invention will be described in detail below. It should be noted that information in each database 24, 26, and 28 may be stored in its own memory device, e.g., disk, or together on the same disk or other memory device. Memory capacity 29 is preferably also provided for storing personalized weather reports generated by the computer 12 in the form of personalized user internet web pages, as will be described in more detail below.

In accordance with the present invention, the main computer system 12 is programmed, using conventional programming techniques, to perform various functions to provide personalized weather reports to users. Such functions to be performed by the main computer 12 include a weather forecast model data generator function, a user profile generator function, and a personalized report generator function. Each of these functions will be described in more detail below.

Any conventional commercially available weather forecasting model may be employed in the main computer system 12 to implement the weather forecast model data generator function. Such models typically generate modeled weather forecast data based on atmospheric condition initialization data. Preferably, the weather forecasting model employed is capable of providing highly detailed and accurate weather forecasts of various weather parameters of interest, e.g., temperature, sky conditions, winds, precipitation, etc., with a high degree of both geographical and temporal resolution. An example of such a preferred weather forecasting model is the ADONIS model, available from Weather Central, Inc., of Madison, Wisconsin. As discussed above, this non-hydrostatic model is capable of providing accurate and detailed forecast weather parameters for geographical areas a few miles across at half-hour increments for at least 120 half-hour periods into the future. (The degree of geographic and temporal resolution is user adjustable, and may be provided over longer or shorter time periods.) Based on calculated forecast weather parameters for discrete closely spaced points in a geographic area, the model automatically and accurately extrapolates forecast weather conditions for any lat./lon. coordinate within the modeled area.

As discussed above, detailed and accurate weather forecasting models require powerful and expensive computer resources and significant processing time to provide high geographic and temporal resolution weather forecast data. For a single conventional computer system, at a single location, to provide such data for the entire country would take a prohibitively long period of time. The problem of computation resources and run times is exacerbated when one considers the need also to automatically generate personalized weather reports from modeled forecast data, and to deliver such reports to users throughout the country. However, such high resolution forecast data is required to provide the accurate personalized weather reports for particular locations (residences or places of work) of interest which users require. In accordance with the present invention, a single computer system 12 need not model such detailed and high resolution forecast data for the entire country. Rather, the computer system 12 need only provide high resolution forecast data (and generate and deliver personalized weather reports based thereon) for a wide, but limited, geographic area served by, e.g., a television or radio station or newspaper. For example, the weather forecasting model run on the television or radio station's main computer system 12 may provide detailed and high resolution weather forecast data only for the geographical viewing or listening area served by the station. Thus, the television or radio station can provide personalized weather reports to viewers or listeners in its service area without the need for unreasonable computer resources or computation times.

With advances in computer technology, it may be possible in the future to employ a single computer system for high resolution weather forecast modeling and personalized weather report generation for a wide geographic area, such as the entire United States, at a reasonable cost and computing time. Alternatively, current systems may be employed to model weather conditions with less temporal and geographic resolution, but over a wider geographic area, at a reasonable cost and computing time. A preferred alternative is to employ the computer system 12 to run a high resolution weather forecast model for a limited geographic area, such as a local television or radio station's viewing/listening area, as discussed above, and a less high resolution model for a wider area outside of the limited geographic area. The vast majority of users obtaining personalized weather reports from the local system 10 will be interested in receiving such reports for locations within the limited local geographic area, and will, therefore, receive detailed reports based on the high resolution model data. Those who live and work within the limited geographic area, but who are interested in obtaining personalized weather forecasts for locations outside of the limited geographic area (e.g., for a vacation home location), may be provided a personalized weather report for such a location, but based on lower resolution model data. Thus, personalized weather reports may be provided from a single local computer system 12 for locations over a wide geographic area of interest, with most users, whose locations of interest lie in a more limited geographic area, being provided personalized weather reports for such locations based on high geographic and temporal resolution model data. This result can be obtained using conventional computer systems of reasonable cost and reasonable computation times.

An exemplary weather forecasting model which may be employed by a television or radio station to generate detailed and high resolution weather forecast data for the particular geographical area served by the station is the commercially available ADONIS Microcast weather forecast modeling product available from Weather Central, Inc., of Madison, Wis. This product is capable of providing the same high geographic and temporal resolution weather forecast data produced by ADONIS, as described above, for a wide, but limited geographical area using reasonable computation resources and computation times. This model employs initial atmospheric condition data 30 which is computed at a central location from "raw" observational data provided by the National Weather Service and other agencies. The initialization data 30 is provided periodically, e.g., twice a day, from the central location to the main computer system 12. The initial conditions 30 may be provided to the main computer system 12 running the weather forecasting model via a direct communication link 32 (e.g., a satellite link) or, alternatively, via the internet 14, via a server 34, in either case using conventional data transfer protocols.

The detailed high resolution weather forecast model data generated by the forecasting model employed in the computer system 12 may be subject to constraints, provided via a constrainer module 36, before such model data is employed to generate a personalized weather report in accordance with the present invention. The constraints 36 may be provided to the computer system in a variety of ways. For example, constraints 36 may be provided to the computer system 12 directly, such as by a meteorologist or other operator entering such constraints directly into the computer system 12 via a keyboard or other input device associated therewith. Alternatively, or additionally, constraints 36 may be provided to the computer system 12 from a remote location, e.g., via a direct communications link (e.g., a satellite link) or via the internet 14 or another communications network. Constraints 36 may be applied to any modeled weather condition, e.g., temperature, wind speed, precipitation, etc., and may be applied throughout an entire modeled geographic area, or to selected portions thereof. The constraints 36 limit the modeled weather conditions which are used to generate personalized weather reports in accordance with the present invention to enhance the accuracy of such reports. For example, a meteorologist may determine, based on experience and/or information which is not available to the model employed, that, for example, the high temperature or precipitation for a modeled region and time will not exceed certain levels. Such limits may be provided to the computer system 12 as constraints 36, to ensure that no personalized weather report for locations within such region forecasts predicted temperatures or precipitation exceeding the constrained levels.

Figure 2:
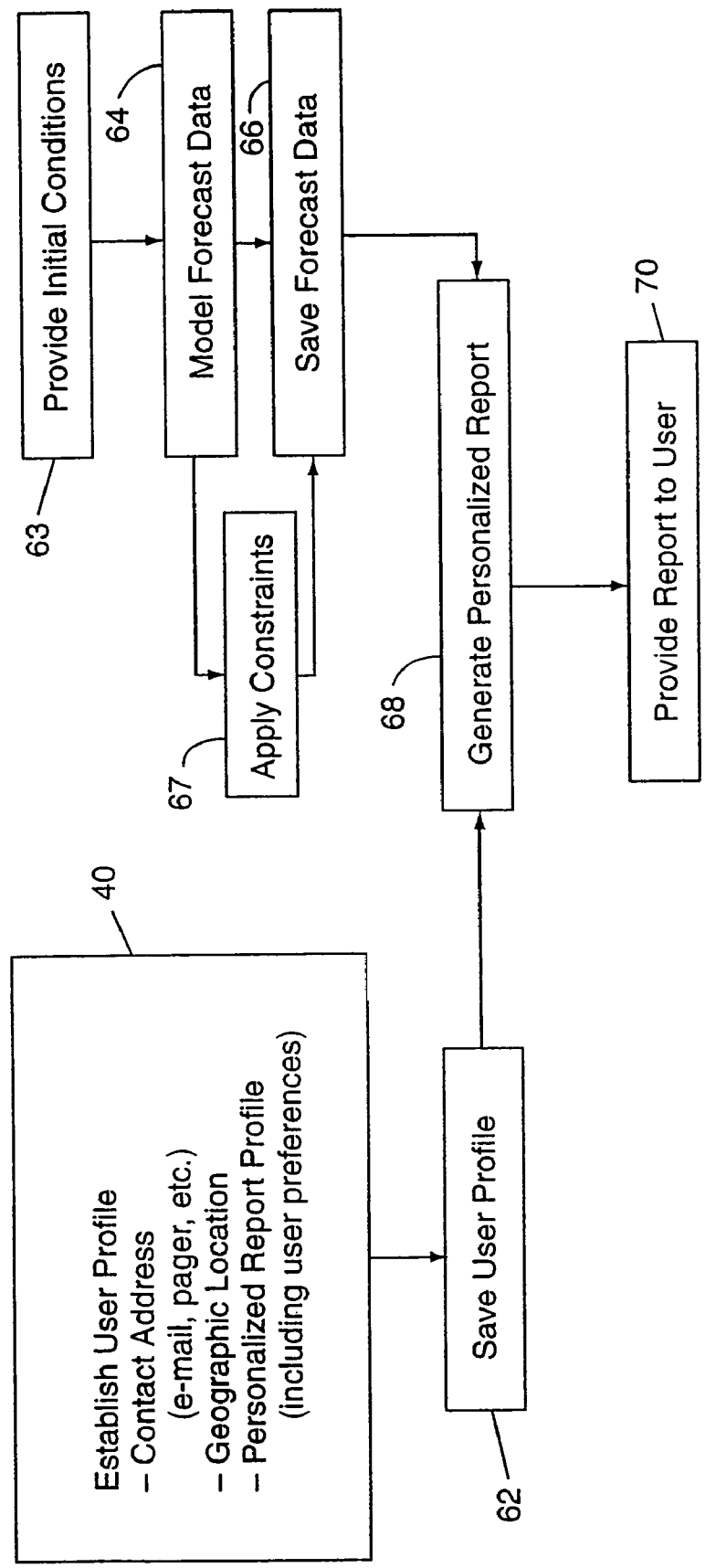
FIG. 2 is a schematic flowchart diagram of an exemplary method for providing personalized weather reports in accordance with the present invention.
Figure 3:
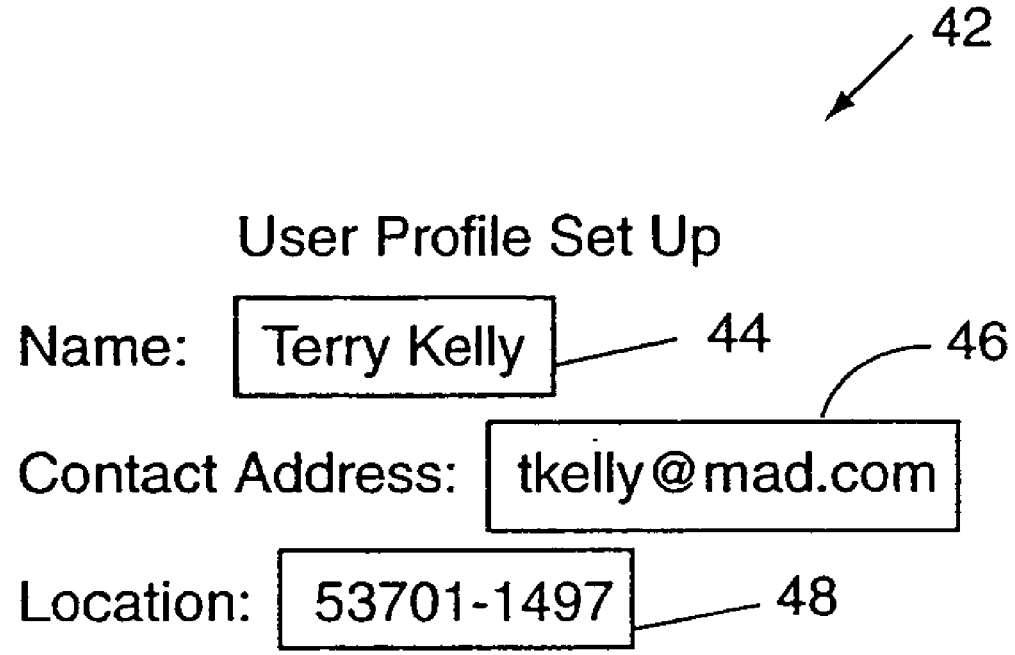
FIG. 3 is an exemplary user profile set-up menu user interface for use in a system and method for providing personalized weather reports in accordance with the present invention.

An exemplary method, employing the system 10 described with reference to FIG. 1, for providing personalized weather reports and the like to a user will now be described in detail with reference to the exemplary flowchart diagram of FIG. 2. The process of providing a personalized weather report to a user begins with the establishment of a user profile 40. The user profile may be established by each user himself. For example, a user may establish a user profile by connecting with the main computer system 12 over, e.g., the internet 14. The user profile generator function, running on the main computer system 12, may preferably provide a user profile set-up menu user interface as a web page which may be accessed by the user over the internet. An exemplary, and very simplified, user profile set-up menu user interface is illustrated at 42 in FIG. 3. The user profile set-up menu user interface 42 prompts a user to provide a name 44, contact address 46, and location identification 48. (The user profile set-up menu user interface 42 may also prompt the user to provide other information, e.g., billing, e.g., credit card, information for billing the cost of personalized weather reports to the user, in a conventional manner. The page on which the user profile set-up menu user interface 42 is provided may also include advertisements and hypertext links to other web pages or sites on the internet, in a conventional manner.)

The contact address 46 is the address to which the user would like his personalized weather reports to be sent. This may be, for example, an internet e-mail address, for providing the personalized reports to the user's computer 16 over the internet 14, or may identify another destination or medium for transmitting the reports to a user. For example, personalized weather reports may be provided by the main computer system 12 to a user's alphanumeric pager or cellular phone 18 (e.g., using a conventional voice synthesizer) (see FIG. 1), in which case the contact address may be a cell phone or pager number. Alternatively, or additionally, the computer system 12 may automatically generate a personalized internet web page address, at which the user's personalized weather report will be accessible, from the information provided by the user via the user profile set-up menu user interface 42. The user's personalized internet web page address may be provided to the user at the user's contact address 46. For example, the user's personalized internet web page address may be provided in an e-mail or phone message provided to the user at the user's contact address 46.

The location 48 is the geographical location for which the user is interested in receiving a detailed weather report. For example, the location may be the user's home or work location, or the location of business activity, such as a construction site. Various methods may be used for identifying the desired location. For example, the user may provide a street address or a United States Postal Service zip+4 code, either of which will identify the location of interest with sufficient detail. Since the weather forecast model run on the main computer system 12 will typically produce weather forecast data for geographic locations identified by lat./lon. coordinates, it will typically be necessary to convert the location 48 entered by the user in the user profile set-up menu user interface 42 into a lat./lon. coordinate. For this purpose, the main computer system 12 may employ a geographic location database 24, which may include a table or other data structure for converting street addresses, zip+4 codes, etc. to corresponding lat./lon. coordinates.

Preferably, a user may also be prompted to identify outdoor or other activities in which the user is interested and for which the user would like advance notice of favorable (or unfavorable) weather conditions. An exemplary user activity weather condition profile set-up menu, which may be generated by the user profile generator, is illustrated at 50 in FIG. 4. The user may be provided with a predefined list 51 of typical outdoor activities from which to select. Having selected one or more activities from the activity list 51, the user is prompted to provide a label 52 describing the particular activity/event of interest. The user is then prompted to select a desired location 53 or locations for performing the activity. The menu 50 may prompt a user to select a location from a selection of locations previously stored in the system, such as a golf course or courses at which the user is interested in playing, or may require the user specifically to identify the activity location of interest, e.g., by postal code or latitude and longitude, as described above. The geographical location database 24 preferably includes lat./lon. coordinates for activity locations, e.g., golf courses, lakes for fishing, beaches for wind surfing, etc., which may be selected by a user, such that the main computer system 12 may convert such locations to lat./lon. coordinates, as discussed above. The user may be prompted to select desired days and times 54 for the activities of interest. Finally, the user is prompted to select weather conditions (e.g., temperatures, sky conditions, humidity, precipitation, wind speed and wind direction) of interest for such activities, and ideal ranges for such conditions. If a weather condition is selected as being of interest, e.g., by selecting a check box 55 next to the condition in the menu 50, the ranges 56 identified for that condition will be considered in determining if a user weather condition activity profile has been satisfied. (Unselected conditions are always considered satisfied.) Of course, the user may be prompted to provide different or other conditions than those illustrated by example in FIG. 4. The profile weather conditions which a user may be prompted to select may depend on the activity of interest for which a weather condition profile is to be generated. The activity weather condition profile user interface may provide default values for some or all of the conditions, based on, e.g., weather conditions for the activity which are preferred by most or typical participants in the activity, while providing an individual user the opportunity to override the default condition values to establish his or her own preferred weather condition profile. For activities for which a user desires to receive advance notice of favorable (or unfavorable) conditions, but which are not listed in the predefined selected activities list 51, the user may describe another activity 57 and select a location 53, time 54, and ranges 56 of selected conditions 55 for conditions modeled by the weather forecast model to establish a personalized activity weather condition profile. Such other activities may include business activities, allowing a user to define a profile of desired business conditions, for example, for pouring concrete or erecting a crane at a designated construction location. The user activity weather condition profile set-up menu 50 preferably also provides a user interface 58 which allows a user to activate a profile which has been defined using the set-up menu 50, to delete a profile, or to reset the information entered into the menu 50 to default values.

Having established a user profile, using the user profile set-up 42 and related user interface menus, the user profile is saved 62 by the main computer system 12, e.g., in a user profile database 26. Of course, many individual user profiles may be established by individual users and saved by the main computer system 12 in the user profile database 26. A user is preferably able to change any user definable portion of his user profile at any time by re-accessing the user interface menus 42 and 50, e.g., over the internet connection 14, and making any desired changes. For security purposes, a user may be requested to establish a user password upon initially establishing a user profile, and may be prompted to enter this password before being allowed to make any changes to a previously established user profile.

Periodically, e.g., twice a day, the main computer system 12 runs 64 the weather forecasting model, as described above, to provide detailed accurate high resolution weather forecast data. As discussed above, depending upon the model employed, the weather forecast model may require initial conditions 30 to be provided thereto 63. For example, initial conditions may be provided to the computer system 12, e.g., twice a day, from a remote central location, and the weather forecast model run 64 each time the initial conditions are provided. The resulting detailed high resolution weather forecast model data is saved by the main computer system 12 into a forecast database 28 at 66. As discussed above, the detailed weather forecast data includes detailed weather condition information, e.g., temperatures, sky conditions, winds, precipitation, etc., for specific geographic locations (preferably no more than a few miles apart) and with a high degree of temporal resolution (e.g., for half-hour increments) extending up to several days into the future. If any constraints 36 on the forecast model data have been previously provided to the computer system 12, such constraints are preferably applied at 67 to the model forecast data 64 before the forecast data is saved 66. Thus, constrained modeled forecast data is saved 66 and employed to generate personalized weather reports in accordance with the present invention.

The saved weather forecast data from the forecast database 28 is combined by the personalized report generator function in main computer system 12 with the user profile data in the user profile database 26 at 68 to generate a personalized weather report for each user who has established a user profile. The step 68 of generating a personalized weather report may be performed automatically, for example, each time the weather forecast model is run to generate weather forecast data. If both high resolution (for a limited geographic area) and lower resolution (for a wider geographic area) weather forecast model data is obtained, the high resolution data is employed to generate personalized weather reports for locations within the limited geographic area, and the lower resolution data is employed to generate personalized weather reports for other locations. For example, as part of the process 66 of generating personalized weather reports, it may be determined if each user location of interest is located within the limited geographic area for which high resolution weather forecast model data was obtained. If location of interest is within the limited area, the high resolution data is used to generate a personalized weather report for the location, otherwise the lower resolution data is used. The personalized weather report is then provided at 70 to the user. The personalized weather report may be delivered to the user at the contact address 46 provided by the user in the user profile set-up menu user interface 42. For example, the computer system 12 may include a personalized weather report generator which generates a personalized weather report in the form of a text e-mail message which is sent to the user periodically, e.g., twice a day.

An exemplary personalized weather report e-mail message 72, which may be generated and delivered to a user in this manner, is shown in FIG. 5. Note that a personalized weather report e-mail message provided in accordance with the present invention may provide additional or different information, and may have a different format than the message 72 shown by example in FIG. 5. (Additionally, the personalized weather report e-mail message may include advertisements and hypertext links to web sites in a conventional manner.) The personalized weather report e-mail message 72 may be generated from a report form template. Individual condition values, e.g., temperatures, precipitation, times of occurrences, etc., are extracted by the personalized report generator function from the modeled forecast data and inserted into the proper position in the template to generate the personalized weather report 72. For example, a sentence template 74 may be provided for reporting forecast rain conditions in the personalized report message 72. If the modeled forecast data indicates rain for the selected user location, the sentence template 74 is added to the message 72, with details on when the rain will start 76 and end 78 and how much rain will be received 80 at the location extracted from the weather model forecast data and inserted into the sentence template. (For very widely scattered "on-and-off" precipitation conditions, the user may be presented with a percentage likelihood of precipitation between specified times.) Other sentence templates may be employed in a similar manner for other weather conditions.

As discussed above, a personalized weather report in accordance with the present invention may be provided in other than a text format to a contact address other than a computer. For example, the personalized report may be provided as an oral report to a user's computer or telephone, using conventional voice synthesization technology. In addition to text, the personalized report may include still or animated graphics of weather conditions at the selected location. Such graphics may be generated in a conventional manner from the available weather forecast model data, and may be delivered as part of the personalized weather report or accessed from the weather report, e.g., by a hyperlink.

Figure 6B:
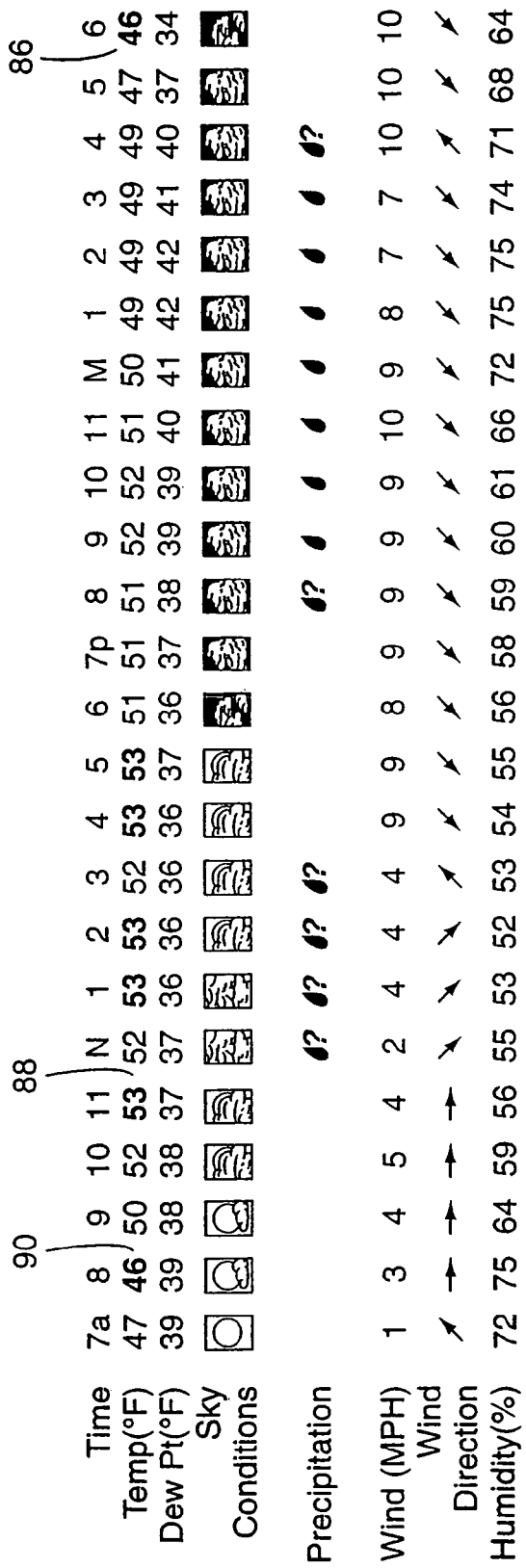
FIG. 6 is an exemplary personalized internet web page providing a detailed personalized weather report in accordance with the present invention.
Figure 6D:
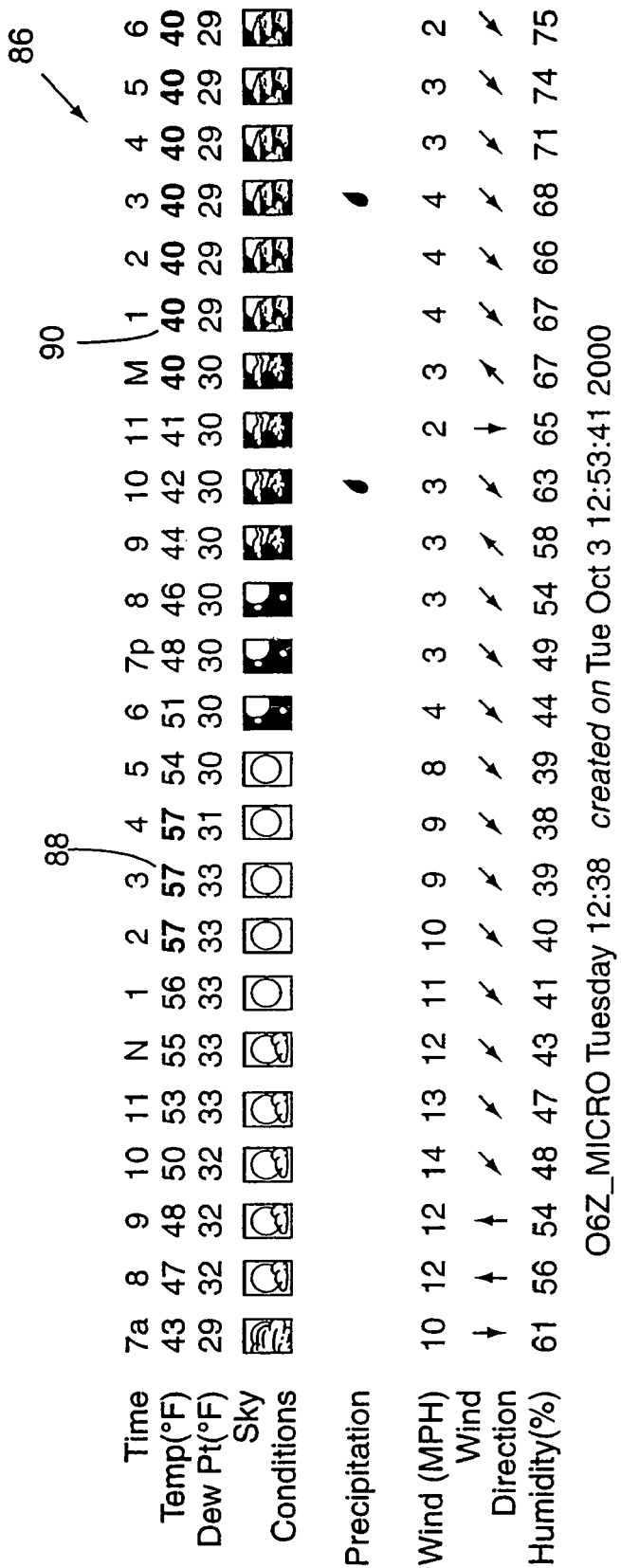

Alternatively, or additionally, a personalized weather report in accordance with the present invention may be provided as a personalized internet web page, which is accessible by a user at the user's personalized internet web page address. An exemplary personalized internet web page weather report is illustrated at 82 in FIG. 6. Note that a personalized internet web page weather report in accordance with the present invention may provide additional or different information, and may have a different format than, the web page 82 shown by example in FIG. 6. The personalized internet web page weather report 82 may include summaries 84 of weather conditions at the user location of interest over a forecast period, e.g., several days. The personalized internet web page weather report 82 preferably also includes a more detailed high resolution weather forecast 86 for the user location. As discussed above, the weather condition information for the high resolution weather forecast 86 may be extracted automatically from the high resolution weather model forecast data. The high resolution weather forecast 86 preferably provides detailed weather condition information for the user's location of interest for several time periods (e.g., each hour) throughout a day, in an easily readable form. For example, as illustrated in FIG. 6, the high resolution weather forecast 86 may be presented in an easily readable tabular form, with weather conditions (e.g., temperature, dew point, sky conditions, precipitation, wind speed, wind direction, humidity, etc.) for each time period (e.g., hour) through the day presented in textual or graphical form in a table. Notable weather condition events, such as daily high 88 and low 90 temperatures, may be highlighted within the table. For example, the daily high 88 and low 90 temperatures may be highlighted in bold text and/or different colors (e.g., red for daily highs, blue for daily lows), to bring the time of occurrence of such conditions to a user's attention.

A personalized weather report in accordance with the present invention may be provided to a user in more than one format. For example, a user may be provided with a summary personalized weather report e-mail message, delivered to the user contact e-mail address, as well as a personalized internet web page weather report, which is accessible by a user at the user's personalized internet web page address. An exemplary summary personalized weather report e-mail message is shown at 92 in FIG. 7. The summary personalized weather report e-mail message 92 provides a brief summary of forecast weather conditions for the user's location of interest. Such a summary weather report may be automatically generated by the personalized report generator function of the system computer 12, and delivered to the user's e-mail contact address, e.g., each time the weather forecast model is run (e.g., twice each day). The summary weather report provided in the summary personalized weather report e-mail message 92 may be derived by the system computer 12 from the weather model forecast data. A more detailed high resolution personalized weather forecast report may be made available to the user at the personalized internet web page accessible by the user at the user's personalized internet web page address. A link 94 to the user's personalized internet web page report may be provided as part of the summary personalized e-mail message weather report 92. The summary personalized e-mail message weather report 92 thus serves the multiple functions of notifying a user that an updated personalized weather forecast report is available, providing a brief summary of that personalized weather report to a user, and providing an easy link to the more detailed personalized internet web page weather report. It should be noted that personalized weather report data in accordance with the present invention may also, or alternatively, be provided over the internet to a user having a program (a bug) running on the user's computer 16 which can continually display the weather report and automatically update the report displayed each time new report data is generated.

A personalized weather report in accordance with the present invention provides a detailed weather forecast for the location identified by the user in the user profile set-up menu, not merely a general forecast for a large geographic region which may incorporate that location. If the weather forecast model has not generated a set of forecast conditions for the exact lat./lon. corresponding to the location identified by the user, the computer system 12 may extrapolate conditions for the location from modeled conditions for nearly adjacent locations. Since the weather forecast model preferably provides high resolution forecast data for locations separated by no more than a few miles, such an extrapolation process should provide an accurate indication of forecast weather conditions at the location of interest to the user.

If a user has established a weather condition profile for one or more activities, such profiles may be compared to the saved forecast data by the personalized weather report generator as part of the step of generating a personalized weather report. If forecast conditions for the indicated activity location satisfy the established profile, a personalized report, e.g., an e-mail message, which may be included as part of or separate from the personalized weather report e-mail message 72, is sent to the user to provide advanced notice to the user of when and where the favorable conditions are to occur. An exemplary personalized e-mail message of this type, indicating, in this case, that forecast conditions do not satisfy the weather condition profile established by the user for an activity of interest, is shown at 96 in FIG. 8. Note that such an e-mail message 96 may preferably include a link 98 to the user's personalized internet web page weather report 82, where more detail may be obtained, as discussed above. Note also that personal activity weather condition profiles established by a user may be accessed by the user via the user's personalized internet web page weather report 82, and new personal activity weather condition profiles established, via a user interface 99 provided on the user's personalized internet web page 82. (See FIG. 6)

In addition to providing advanced weather forecast information, the personalized weather report may provide current weather condition information, severe weather warning reports, and other information for the indicated location to a user at the user's contact address. Such reports and warnings may be generated automatically based, e.g., on current weather condition information, provided, e.g., by local and/or remote weather radar systems 82, which is provided to the main computer system 12 (see FIG. 1). Other information, such as traffic information, may also be provided automatically as part of the personalized report based, e.g., on traffic information 84 provided to the main computer system 12.

It should be understood that the present invention is not limited to the particular embodiments and examples illustrated and described herein, but embraces all such modified forms thereof as come within the scope of the following claims. For example, even though it is preferred that personalized weather reports in accordance with the present invention be generated by computers located at local radio or television stations, etc., for their local region of interest, based on locally generated model data and initialization conditions only provided from a central location, a central system may be used to provide detailed personalized weather reports for users throughout the country if sufficient computer resources are available at a central site.

What is claimed is:

1. A method for generating a personalized weather report, comprising the steps of:
   (a) establishing a user profile including a user defined location of interest;
   (b) providing a personalized internet web page address to a user;
   (c) generating forecast weather condition data for an area including the location of interest;
   (d) generating a personalized weather forecast and weather report of forecast weather conditions at the location of interest automatically from the user profile and the forecast weather condition data; and
   (e) providing the weather report so as to be accessible at the personalized Internet web page address.

2. The method of claim 1 wherein the step of establishing a user profile includes the step of providing a user profile set-up menu user interface.

3. The method of claim 1 wherein the step of establishing a user profile includes the step of establishing a user contact address.

4. The method of claim 3 wherein the step of providing the personalized internet web page address to a user includes the step of providing the personalized internet web page address to the user contact address.

5. The method of claim 4 wherein the user contact address is an e-mail address and wherein the step of providing the personalized internet web page address to a user includes the step of providing the personalized internet web page address in an e-mail message provided to the e-mail address.

6. The method of claim 3 comprising additionally the step of providing the weather report to the user contact address.

7. The method of claim 6 wherein the user contact address is an e-mail address, the step of generating the weather report includes the step of generating a weather report e-mail message, and the step of providing the weather report to the user contact address includes the step of sending the weather report e-mail message to the user contact e-mail address.

8. The method of claim 7 wherein the step of generating the weather report e-mail message includes the step of providing a link to the personalized internet web page address in the weather report e-mail message.

9. The method of claim 7 wherein the step of generating the weather report includes the step of generating a summary weather report e-mail message providing a less detailed report of forecast weather conditions than the personalized weather report of forecast weather conditions provided so as to be accessible at the personalized Internet web page address.

10. The method of claim 1 wherein the step of generating forecast weather condition data includes the step of running a weather forecast model to generate weather forecast model data for an area including the location of interest.

11. The method of claim 10 wherein the step of generating a personalized weather forecast of weather conditions includes the step of extrapolating weather conditions for the location of interest from the weather forecast model data.

12. A personalized weather report generating system, comprising:
   (a) user profile generator means for generating a user profile including a user defined location of interest and a personalized internet web page address;
   (b) means for providing the personalized internet web page address to a user;
   (c) weather forecast model data generator means for generating weather forecast model data for an area including the location of interest;
   (d) weather report generator means for generating a personalized weather forecast and a weather report of forecast weather conditions at the location of interest automatically from the user profile and the weather forecast model data and providing the weather report so as to be accessible at the personalized Internet web page address.

13. The personalized weather report generating system of claim 12 wherein the user profile generator means, the weather forecast model data generator means, and the weather report generator means are implemented in at least one general purpose computer.

14. The personalized weather report generating system of claim 12 wherein the user profile generator means includes means for generating a user profile set-up menu user interface and for providing the user profile set-up menu user interface to a user.

15. The personalized weather report generating system of claim 12 wherein the means for providing the personalized internet web page address to a user includes means for providing the personalized internet web page address to a user contact address.

16. The personalized weather report generating system of claim 15 wherein the user contact address is an e-mail address and the means for providing the personalized internet web page address to a user includes means for providing the personalized internet web page address in an e-mail message provided to the e-mail address.

17. The personalized weather report generating system of claim 12 comprising additionally means for providing the weather report to a user contact address.

18. The personalized weather report generating system of claim 17 wherein the user contact address is an e-mail address and the means for providing the weather report to the user contact address includes means for generating a weather report e-mail message and means for providing the weather report e-mail message to the user contact e-mail address.

19. The personalized weather report generating system of claim 18 wherein the means for generating the weather report e-mail message includes means for providing a link to the personalized internet web page address in the weather report e-mail message.

20. The personalized weather report generating system of claim 18 wherein the weather report generator means includes means for generating a summary weather report e-mail message providing a less detailed report of forecast weather conditions than the personalized weather report of forecast weather conditions provided so as to be accessible at the personalized Internet web page address.

21. A method of generating a personalized weather report, comprising the steps of:
   (a) establishing a user profile including a user defined location of interest;
   (b) generating forecast weather condition data for an area including the location of interest; and
   (c) generating a personalized weather forecast and weather report of forecast weather conditions at the location of interest automatically from the user profile and the forecast weather condition data, wherein the weather report of forecast weather conditions includes a tabular representation of a plurality of forecast weather conditions including forecast temperature conditions for at least each hour throughout a day, and wherein a daily forecast high temperature condition and a daily forecast low temperature condition in the tabular representation of forecast weather conditions is highlighted.

22. The method of claim 21 wherein the step of generating a personalized weather forecast and weather report of forecast weather conditions includes the step of generating a tabular representation of a plurality of forecast weather conditions for at least each hour throughout a day, and wherein selected ones of the plurality of forecast weather conditions are presented in graphical form in the tabular representation.

23. The method of claim 21 wherein the daily forecast high temperature condition and daily forecast low temperature condition in the tabular representation of forecast weather conditions is highlighted by color.

24. The method of claim 21 wherein the daily forecast high temperature condition and daily forecast low temperature condition in the tabular representation of forecast weather conditions is highlighted by size.

25. The method of claim 21 comprising additionally the step of providing the weather report to a user.

26. The method of claim 25 comprising additionally the step of providing a personalized internet web page address to a user and wherein the step of providing the weather report to the user includes the step of providing the weather report so as to be accessible at the personalized internet web page address.

27. The method of claim 21 wherein the step of generating a forecast of weather condition data includes the step of running a weather forecast model to generate weather forecast model data for an area including the location of interest.

28. A personalized weather report generating system, comprising:
   (a) user profile generator means for generating a user profile including a user defined location of interest;
   (b) a weather forecast model data generator means for generating weather forecast model data for an area including the area of interest; and
   (c) a weather report generator means for generating a personalized weather forecast and weather report of forecast weather conditions at the location of interest automatically from the user profile and the weather forecast model data, wherein the weather report of forecast weather conditions includes a tabular representation of a plurality of forecast weather conditions including forecast temperature conditions for at least each hour throughout a day, and wherein a daily forecast high temperature condition and a daily forecast low temperature condition in the tabular representation of forecast weather conditions is highlighted.

29. The personalized weather report generating system of claim 28 wherein the user profile generator means, the weather forecast model data generator means, and the weather report generator means are implemented in at least one general purpose computer.

30. The personalized weather report generating system of claim 28 wherein the weather report generator means for generating a personalized weather forecast and weather report of forecast weather conditions includes means for generating a tabular representation of a plurality of forecast weather conditions for at least each hour throughout a day, and wherein selected ones of the plurality of forecast weather conditions are presented in graphical form in the tabular representation.

31. The personalized weather report generating system of claim 28 wherein the daily forecast high temperature condition and the daily forecast low temperature condition in the tabular representation of forecast weather conditions is highlighted by color.

32. The personalized weather report generating system of claim 28 wherein the daily forecast high temperature condition and the daily forecast low temperature condition in the tabular representation of forecast weather conditions is highlighted by size.

33. The personalized weather report generating system of claim 28 comprising additionally means for providing the weather report to a user.

34. The personalized weather report generating system of claim 33 comprising additionally means for providing a personalized internet web page address to a user and wherein the means for providing the weather report to the user includes means for providing the weather report so as to be accessible at the personalized internet web page address.

* * * * *